(12) United States Patent
Araujo Da Silva et al.

(10) Patent No.: US 9,006,321 B2
(45) Date of Patent: *Apr. 14, 2015

(54) COMPOSITION MADE FROM NATURAL RUBBER AND A POLYIMINE COMPOUND

(75) Inventors: José Carlos Araujo Da Silva, Pont du Chateau (FR); Justin Belz, Riom (FR); Stéphanie De Landtsheer, Moscou (RU); Nathalie Simon, Maringues (FR); Brigitte Chauvin, Chamalieres (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 197 days.

This patent is subject to a terminal disclaimer.

(21) Appl. No.: 13/383,046

(22) PCT Filed: Jul. 8, 2010

(86) PCT No.: PCT/EP2010/059827
§ 371 (c)(1),
(2), (4) Date: Feb. 22, 2012

(87) PCT Pub. No.: WO2011/003981
PCT Pub. Date: Jan. 13, 2011

(65) Prior Publication Data
US 2012/0196960 A1  Aug. 2, 2012

(30) Foreign Application Priority Data

Jul. 10, 2009  (FR) .................................... 09 03435

(51) Int. Cl.
*C08K 5/29* (2006.01)
*C08K 5/16* (2006.01)
*B60C 1/00* (2006.01)

(52) U.S. Cl.
CPC ................. *B60C 1/0016* (2013.04); *C08K 5/29* (2013.01)

(58) Field of Classification Search
USPC ....................................................... 524/237
See application file for complete search history.

(56) References Cited

U.S. PATENT DOCUMENTS

| | | | |
|---|---|---|---|
| 3,668,183 | A | 6/1972 | Hoy et al. |
| 6,774,255 | B1 | 8/2004 | Tardivat et al. |
| 6,849,754 | B2 | 2/2005 | Deschler et al. |
| 2004/0051210 | A1 | 3/2004 | Tardivat et al. |
| 2004/0132880 | A1 | 7/2004 | Durel et al. |
| 2005/0016650 | A1 | 1/2005 | Durel et al. |
| 2005/0016651 | A1 | 1/2005 | Durel et al. |
| 2008/0154020 | A1 | 6/2008 | Yan et al. |
| 2011/0178233 | A1 | 7/2011 | Chaboche et al. |

FOREIGN PATENT DOCUMENTS

| | | | | |
|---|---|---|---|---|
| FR | 760 442 | A | 2/1934 | |
| FR | 852.868 | | 3/1940 | |
| FR | 2 291 064 | A1 | 6/1976 | |
| FR | 2 291 065 | A1 | 6/1976 | |
| JP | 2-117939 | A | 5/1990 | |
| JP | 02117939 | A * | 5/1990 | ............... C08L 7/00 |
| JP | 2006-63206 | A | 3/2006 | |
| JP | 2006063206 | * | 3/2006 | ............. C08L 21/00 |
| JP | 2012-519000 | A | 3/2012 | |
| JP | 2012-532945 | A | 12/2012 | |
| WO | WO 96/37547 | A2 | 11/1996 | |
| WO | WO 99/09036 | A1 | 2/1999 | |
| WO | WO 00/05300 | A1 | 2/2000 | |
| WO | WO 01/55252 | A1 | 8/2001 | |
| WO | WO 01/96442 | A1 | 12/2001 | |
| WO | WO 02/10269 | A2 | 2/2002 | |
| WO | WO 02/30939 | A1 | 4/2002 | |
| WO | WO 02/31041 | A1 | 4/2002 | |
| WO | WO 02/053634 | A1 | 7/2002 | |
| WO | WO 02/083782 | A1 | 10/2002 | |
| WO | WO 03/002648 | A1 | 1/2003 | |
| WO | WO 03/002649 | A1 | 1/2003 | |
| WO | WO 03/002653 | A1 | 1/2003 | |
| WO | WO 03/016387 | A1 | 2/2003 | |
| WO | WO 2005/087859 | A1 | 9/2005 | |
| WO | WO 2006/002993 | A1 | 1/2006 | |
| WO | WO 2006/023815 | A2 | 3/2006 | |
| WO | WO 2006/061064 | A1 | 6/2006 | |
| WO | WO 2006/069792 | A1 | 7/2006 | |
| WO | WO 2006/069793 | A1 | 7/2006 | |
| WO | WO 2006/125532 | A1 | 11/2006 | |
| WO | WO 2006/125533 | A1 | 11/2006 | |
| WO | WO 2006/125534 | A1 | 11/2006 | |
| WO | WO 2007/003408 | A1 | 1/2007 | |
| WO | WO 2007/017060 | A1 | 2/2007 | |
| WO | WO 2007/098080 | A2 | 8/2007 | |
| WO | WO 2008/003434 | A1 | 1/2008 | |
| WO | WO 2008/003435 | A1 | 1/2008 | |
| WO | WO 2008/141702 | A1 | 11/2008 | |

OTHER PUBLICATIONS

Translation of JP 2006-063206, Mar. 9, 2006.*
Japanese Appl. No. JP2012-518999—Official Action dated Jan. 6, 2014, 4 pgs.
International Search Report (PCT/ISA/210) issued on Mar. 24, 2011, by European Patent Office as the International Searching Authority for International Application No. PCT/EP2010/059827.
F.A. Carey et al., Advanced Organic Chemistry, Part B: Reactions and Synthesis, 4th Edition, pp. 31-33.
J. March, Advanced Organic Chemistry, Reactions, Mechanisms, and Structure, 5th Edition, pp. 1185-1187.

* cited by examiner

*Primary Examiner* — Hui Chin
(74) *Attorney, Agent, or Firm* — Dickinson Wright PLLC

(57) ABSTRACT

Reinforced rubber composition, exhibiting improved hysteresis, based on at least (a) an elastomeric matrix predominantly based on natural rubber, (b) a reinforcing filler and (c) a specific polyimine compound in a small proportion, preferably ranging from 1 to 5 mmol per 100 g of elastomer.

This rubber composition is intended, for example, for the manufacture of a semi-finished rubber product intended for the tires of motor vehicles.

19 Claims, No Drawings

COMPOSITION MADE FROM NATURAL RUBBER AND A POLYIMINE COMPOUND

The present invention relates to reinforced rubber compositions based on natural rubber comprising at least one polyimine compound having improved hysteresis properties in the vulcanized state. These rubber compositions are intended, for example, for the manufacture of a semi-finished rubber product intended for the tyres of land and air vehicles.

Since savings in fuel and the need to protect the environment have become a priority, it has proved necessary to produce tyres having a rolling resistance that is as low as possible, without having a disadvantageous effect on their wear resistance. This has been made possible in particular by virtue of the use, in the rubber compositions, of specific inorganic fillers capable of competing, from a reinforcing viewpoint, with an organic filler such as conventional tyre-grade carbon black, while giving these compositions a lower hysteresis, synonymous with a lower rolling resistance for the tyres comprising them.

To further reduce the rolling resistance remains, in the current economic and ecological context, a permanent concern despite the low levels achieved respectively both with the specific inorganic fillers described as "reinforcing" and with a carbon black. Numerous avenues have already been explored in order to further lower the hysteresis of the rubber compositions reinforced with such reinforcing fillers. Mention may be made, by way of example, of the modification of the structure of the diene polymers at the end of polymerization by means of functionalization, coupling or star-branching agents, with the aim of obtaining good interaction between the polymer thus modified and the reinforcing filler. Mention may also be made of patent application WO 96/37547 A1 describing a rubber composition that uses, as reinforcing filler, carbon black with silica attached to its surface and that is based on a functionalized or unfunctionalized diene polymer and on a silane coupling or covering agent in a relatively high amount.

Patent application JP 2006/063206 A1 discloses the addition of polyimines, obtained by reaction of polyamines with a compound having a carbonyl function, in order to improve the abrasion resistance of compositions based on natural or synthetic rubbers containing an inorganic filler as the sole or predominant reinforcing filler or as a blend with carbon black present in a minority amount and a silane coupling agent without significantly deteriorating the elongation and viscoelastic properties of the composition.

The inventors have discovered during their research that in a rubber composition based on natural rubber as the main elastomer and reinforced either with an organic filler such as carbon black or with a reinforcing inorganic filler such as silica or else a blend of organic and inorganic fillers, the addition of certain polyimine compounds gives these vulcanized compositions improved rubber properties, in particular hysteresis properties, and especially makes it possible to significantly decrease the initial hysteresis of the composition. This significant decrease of the hysteresis in the proportions observed within the context of compositions comprising a polyimine compound is, to say the least, unexpected compared to the initial hysteresis exhibited by a composition that is free of polyimine compound.

The significantly improved hysteresis properties of such compositions in accordance with the invention based on natural rubber and on a polyimine compound render the latter particularly suitable for the manufacture of semi-finished rubber products intended for tyres, especially for land motor vehicles, such as under layers, rubbers for coating metallic or textile reinforcements, sidewall rubbers or treads.

Thus, one subject of the present invention is a reinforced rubber composition based at least on an elastomeric matrix comprising natural rubber, on an organic or inorganic reinforcing filler or a blend of the two, on a coupling agent in the event an inorganic reinforcing filler is used and on a polyimine compound corresponding to formula 1 or 2 below:

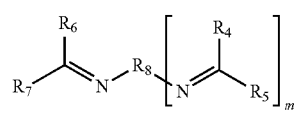

Formula 1

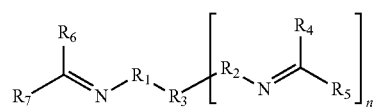

Formula 2 in which:

$R_1$ and $R_2$, which are identical or different, are selected from the group consisting of alkylidenes having from 1 to 20 carbon atoms, cycloalkylidenes having from 5 to 24 carbon atoms, arylidenes having from 6 to 18 carbon atoms, aralkylidenes having from 7 to 25 carbon atoms and heterocycles, which are identical or different, having from 4 to 25 carbon atoms;

$R_4$, $R_5$, $R_6$ and $R_7$, which are identical or different, are selected from alkyl groups having from 1 to 20 carbon atoms, cycloalkyl groups having from 5 to 24 carbon atoms, aryl groups having from 6 to 18 carbon atoms or aralkyl groups having from 7 to 25 carbon atoms;

$R_3$ and $R_8$, which are identical or different, are selected from the group consisting of alkylidenes having from 1 to 20 carbon atoms, alkylidynes having from 1 to 20 carbon atoms, alkylylidynes having from 1 to 20 carbon atoms, cycloalkylidenes having from 5 to 24 carbon atoms, cycloalkylidynes having from 5 to 24 carbon atoms, cycloalkylylidynes having from 5 to 24 carbon atoms, arylidenes having from 6 to 18 carbon atoms, arylidynes having from 6 to 18 carbon atoms, arylylidynes having from 6 to 18 carbon atoms, aralkylidenes having from 7 to 25 carbon atoms, aralkylidynes having from 6 to 18 carbon atoms, aralkylylidynes having from 6 to 18 carbon atoms, and heterocycles, which are identical or different, having from 4 to 25 carbon atoms;

$R_3$ optionally comprises one or more heteroatom(s), chosen from O, N, S and Si;

m is equal to 1, 2 or 3;

n is equal to 1, 2 or 3.

Another subject of the invention is a process for the preparation of such a reinforced rubber composition defined above.

A further subject of the invention is a tyre semi-finished rubber product constituted completely or partly of the reinforced rubber composition defined above.

Another subject of the invention is a tyre comprising at least one semi-finished rubber product constituted completely or partly of the reinforced rubber composition as defined above.

For greater clarity on reading that which will follow, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Furthermore, the amounts of the components of the invention may be expressed in phr, that is to say in parts (by weight) per hundred parts by weight of elastomer.

Thus, a first subject of the invention is a reinforced rubber composition based at least (a) on an elastomeric matrix comprising at least non-halogenated natural rubber predominantly, (b) on a reinforcing filler, (c) on a polyimine compound corresponding to formula 1 or 2 below:

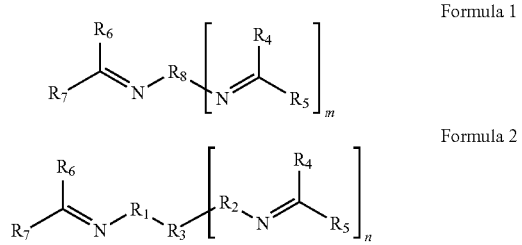

Formula 1

Formula 2 in which:
- $R_1$ and $R_2$, which are identical or different, are selected from the group consisting of alkylidenes having from 1 to 20 carbon atoms, cycloalkylidenes having from 5 to 24 carbon atoms, arylidenes having from 6 to 18 carbon atoms, aralkylidenes having from 7 to 25 carbon atoms and heterocycles, which are identical or different, having from 4 to 25 carbon atoms;
- $R_4$, $R_5$, $R_6$ and $R_7$, which are identical or different, are selected from alkyl groups having from 1 to 20 carbon atoms, cycloalkyl groups having from 5 to 24 carbon atoms, aryl groups having from 6 to 18 carbon atoms or aralkyl groups having from 7 to 25 carbon atoms;
- $R_3$ and $R_8$, which are identical or different, are selected from the group consisting of alkylidenes having from 1 to 20 carbon atoms, alkylidynes having from 1 to 20 carbon atoms, alkylylidynes having from 1 to 20 carbon atoms, cycloalkylidenes having from 5 to 24 carbon atoms, cycloalkylidynes having from 5 to 24 carbon atoms, cycloalkylylidynes having from 5 to 24 carbon atoms, arylidenes having from 6 to 18 carbon atoms, arylidynes having from 6 to 18 carbon atoms, arylylidynes having from 6 to 18 carbon atoms, aralkylidenes having from 7 to 25 carbon atoms, aralkylidynes having from 6 to 18 carbon atoms, aralkylylidynes having from 6 to 18 carbon atoms, and heterocycles, which are identical or different, having from 4 to 25 carbon atoms;
- $R_3$ optionally comprises one or more heteroatom(s), chosen from O, N, S and Si;
- m is equal to 1, 2 or 3;
- n is equal to 1, 2 or 3.

As polyimine compounds, use is preferably made of diimine, triimine and tetraimine compounds. These compounds and their preparation process are described in the prior art, essentially either to improve the abrasion resistance of rubber compositions intended for manufacturing tyres, and mention may be made, in this regard, to the aforementioned patent application JP 2006/063206 A1, or for the preparation of resins according to the process described in patent U.S. Pat. No. 3,668,183.

The polyimine compounds may, for example, be synthesized by condensing an amine with a ketone. This method of preparing imines is described in "Advanced Organic Chemistry, Part B: Reactions and Synthesis" by F. A. Carey and R. J. Sundberg, 4th Edition, p. 31-33, and also in "Advanced Organic Chemistry, Reactions, Mechanisms, and Structure" by J. March, 5th Edition, p. 1185-1187 and in the references cited by these works.

The amines used for the synthesis of the products corresponding to formula 1 may be, for example:
1,2-propylenediamine, 3,3'-dimethyl-4,4'-diamino-dicyclohexylmethane, 4,4'-diaminodicyclohexylmethane, isophore diamine, neopentanediamine(2,2-dimethylpropane-1,3-diamine), 1,8-octamethylenediamine, molten 4,4'-methylenedianiline, ethylene-diamine, 1,3-diaminopropane, 1,6-hexamethylenediamine, 1,4-phenylenediamine, 1,3-phenylenediamine, 1,2-phenylenediamine, 1,2-diaminocyclohexane, 1,3-diamino-cyclohexane, 1,4-diaminocyclohexane, 1,3-diamino-4-methylbenzene and preferably 1,8-octamethylenediamine, 1,6-hexamethylenediamine, 1,2-diaminocyclohexane and 1,4-diaminocyclohexane.

The amines used for the synthesis of the products corresponding to formula 2 may be, for example:
4,7,10-trioxatridecane-1,13-diamine, 4,9-dioxadodecane-1,12-diamine, diethylenetriamine, N-3-amine-(3-(2-aminoethylamino)propylamine), dipropylene triamine, N,N-bis (3-amino-proply)methylamine, N-4-amine-(N,N'-bis(3-aminopropyl)ethylenediamine), 2,4-diamino-6-methyl-1,3,5-triazine, 2,4-diamino-6-phenyl-s-triazine, melamine, triethylenetetramine, tetraethylenepentamine, 2,2',2"-nitrilotriethylamine, 3,6-dioxaoctane-1,8-diamine, N,N,N-tris(2-aminoethyl)amine, bis(3-aminopropyl)tetramethyldisiloxane, 2-(2-amino-ethoxy)ethanamine, 3-{2-[2-(3-aminopropoxy)ethoxy]ethoxy}propan-1-amine, 3-[4-(3-aminopropoxy)phenoxy]propan-1-amine, 3-{2-(3-aminopropoxy)-1- [(3-aminopropoxy) methyl] ethoxy}propan-1-amine, 2-({2-[(2-aminophenyl)thio] ethyl}thio)aniline, 2-[(3-{[(2-aminophenyl)thio]methyl}-2,4,6-trimethylbenzyl)thio]aniline, 2-({4-[(2-aminophenyl)thio]but-2-enyl}thio)aniline and preferably N,N-bis(2-aminoethyl)ethane-1,2-diamine.

The ketones used for the synthesis of the products claimed in formula 1 or 2 may be, for example:
pentan-3-one, 2,2,6,6-tetramethylcyclohexanone, 2,2,4,4-tetramethyl-3-pentanone, 4-methylpentan-2-one, 2,4-dimethylpentan-3-one, 2,6-dimethylheptan-4-one, cyclo-hexanone, acetone, 2,6-dimethylcyclohexanone, 2,2,4,4-tetramethylpentan-3-one, (1,1',3',1")ter(cyclohexan)-2'-one, dicyclohexylmethanone, dicyclopentylmethanone, cyclopentanone, bicyclo[3.3.1]nonan-9-one, dicyclopropylmethanone, 2,6-di-tert-butyl-cyclohexanone, 2,6-dimethylcyclohexanone, 2,4-dimethyl-3-pentanone and preferably 4-methylpentan-2-one, 2,4-dimethylpentan-3-one, 2,6-dimethylheptan-4-one, cyclohexanone and cyclopentanone.

According to the present invention, the polyimine compounds corresponding to formula 1 or 2 are preferably chosen from those for which $R_4$, $R_5$, $R_6$ and $R_7$ are each a hydrocarbon-based radical chosen from unsubstituted, linear or branched, alkyl radicals having 1 to 4 carbon atoms and advantageously $R_4$ and $R_6$ are each a methyl radical, $R_5$ and $R_7$ are each an isobutyl radical or the respective assemblies "$R_4$, $R_5$" or "$R_6$, $R_7$" represent a cycloalkyl radical having 5 or 6 carbon atoms, $R_1$, $R_2$ and $R_8$ are each an unsubstituted, linear or branched, alkylidene radical having 2 to 8 carbon atoms or a cycloalkylidene radical having 6 carbon atoms and $R_3$ is an unsubstituted alkylidene radical having from 2 to 8 carbon atoms or an alkylidene radical having from 2 to 6 carbon atoms comprising N as heteroatom.

More preferably, these polyimine compounds are chosen from N,N'-bis(4-methylpentan-2-ylidene)hexane-1,6-diamine, N,N'-bis(2,6-dimethylheptan-4-ylidene)hexane-1,6-diamine, N,N'-bis(2,4-dimethylpentan-3-ylidene)hexane-1,6-diamine, N,N'-bis(4-methylpentan-2-ylidene)octane-1,8-diamine, N,N'-bis(2,6-dimethylheptan-4-ylidene)octane-1,8-diamine, N,N'-bis(2,4-dimethylpentan-3-ylidene)octane-1,8-diamine, N,N'-dicyclopentylidene-hexane-1,6-diamine, N,N'-dicyclopentylideneoctane-1,8-diamine, N,N'-dicyclohexylidene-hexane-1,6-diamine, N,N'-dicyclohexylideneoctane-1,8-diamine, N,N'-bis(4-methyl-pentan-2-ylidene)cyclohexane-1,4-diamine, N,N'-bis(4-methylpentan-2-ylidene)cyclo-hexane-1,2-diamine, N,N'-bis(2,6-dimethylheptan-4-ylidene)cyclohexane-1,4-diamine, N,N'-bis(2,6-dimethylheptan-4-ylidene)cyclohexane-1,2-diamine, N,N'-dicyclohexylidene-cyclohexane-1,4-diamine, N,N'-dicyclohexylidenecyclohexane-1,2-diamine, N-(4-methylpentan-2-ylidene)-N,N'-bis((4-methylpentan-2-ylideneamino)ethyl)ethane-1,2-diamine and N-(2,6-dimethylheptan-4-ylidene)-N',N'-bis(2-(2,6-dimethylheptan-4-ylideneamino)-ethyl)ethane-1,2-diamine.

The rubber composition of the tyre component according to the invention comprises the polyimine compound in an amount between 0 and 6 mmol per 100 g of elastomer, preferably ranging from 1 to 5 mmol per 100 g of elastomer, that is to say, comprises a small proportion of polyimine compound. The expression "polyimine compound" according to the invention should be understood to mean a compound or a mixture of several compounds corresponding to formula 1 or 2.

According to the invention, the elastomeric matrix of the composition is based on natural rubber. In some cases, the elastomeric matrix can advantageously be entirely composed of natural rubber (100% of the elastomeric matrix is composed of natural rubber). This alternative form is preferably employed when it is a matter of using the rubber composition to manufacture sidewalls or treads for tyres of utility vehicles, such as heavy vehicles, or else certain applications, such as ice or snow, of passenger vehicles, or else to manufacture metal reinforcement/rubber composites, such as, for example, crown or carcass plies.

The elastomeric matrix can also comprise, in addition to natural rubber, at least one other diene elastomer.

This or these other diene elastomers are then present in the matrix in proportions of between 0 and 50% by weight (the limits of this range being excluded), preferably from 5% to 40%, more preferably still from 15% to 40%.

In the case of a blend with at least one other diene elastomer, the weight fraction of natural rubber in the elastomeric matrix is predominant. Preferably, the weight fraction is greater than or equal to 50% by weight of the total weight of the matrix, more preferably still from 60% to 85% by weight of the total weight of the matrix.

Predominant weight fraction according to the invention refers to the highest weight fraction of the blend. Thus, in a ternary NR/elastomer A/elastomer B blend, the weight fractions can be distributed in the proportions 45/30/25 or 40/40/20 or 40/30/30, the predominant weight fractions being respectively 45 or 40, and, in a binary NR/elastomer blend, the weight fractions can be distributed in the proportions 50/50 or 70/30, the predominant weight fractions being 50 or 70.

The term "diene elastomer" should be understood according to the invention as meaning any, optionally functionalized, natural rubber or any synthetic elastomer resulting at least in part from diene monomers. More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units. The optionally functionalized natural rubber is preferably an epoxidised rubber.

The diene elastomer constituting a portion of the elastomeric matrix according to the invention is preferably chosen from the group of highly unsaturated diene elastomers consisting of polybutadienes (BRs), butadiene copolymers, polyisoprenes (PIs), isoprene copolymers and the mixtures of these elastomers. Such copolymers are more preferably chosen from the group consisting of copolymers of butadiene and of a vinylaromatic monomer, more particularly the butadiene/styrene copolymer (SBR), isoprene/butadiene copolymers (BIRs), copolymers of isoprene and of a vinylaromatic monomer, more particularly the isoprene/styrene copolymer (SIR), and isoprene/butadiene/styrene copolymers (SBIRs). Particular preference is given, among these copolymers, to copolymers of butadiene and of a vinylaromatic monomer, more particularly the butadiene/styrene copolymer (SBR).

The diene elastomer constituting a portion of the elastomeric matrix according to the invention may or may not be star-branched, coupled or functionalized, in a way known per se, by means of functionalization, coupling or star-branching agents known to a person skilled in the art. Mention may be made, for example, among others more conventional, of the elastomers coupled according to the processes described in the patent applications in the name of the Applicant Companies WO 08/141702, FR 2 2910 64, FR 2 291 065 and FR 07/60442.

The rubber composition according to the invention comprises at least three compounds, including a reinforcing filler in proportions ranging from 35 to 200 phr. Preferably, the content of total reinforcing filler is between 40 and 140 phr, more preferably between 50 and 130 phr, the optimum being, in a known way, different depending on the specific applications targeted for the tyre; the expected level of reinforcement with regard to a bicycle tyre, for example, is, of course, lower than that required with regard to a tyre capable of running at high speed in a sustained manner, for example a motorcycle tyre, a tyre for a passenger vehicle or a tyre for a utility vehicle, such as a heavy vehicle.

The reinforcing filler is composed of a reinforcing organic filler, such as carbon black, or of a reinforcing inorganic filler, such as reinforcing silica, in proportions ranging from 0 to 100% by weight of the total weight of the composition, or of an organic filler/inorganic filler blend depending on the application targeted. The proportion of organic or inorganic filler is respectively preferably greater than or equal to 50% by weight of the total weight of the composition, more particularly greater than 55% depending on the application targeted.

The second reinforcing filler contained in the blend (mixture) with the predominant reinforcing filler is then preferably present in a weight fraction of less than 50% relative to the total weight of the composition.

The term "reinforcing inorganic filler" should be understood in the present patent application, by definition, as meaning any inorganic or mineral filler, whatever its colour or its origin (natural or synthetic), also known as "white filler", "clear filler", indeed even "non-black filler", in contrast to a conventional organic filler, such as carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The silica used can be any reinforcing silica known to a person skilled in the art, in particular any precipitated or pyrogenic silica exhibiting a BET surface area and a CTAB specific surface area both of less than 450 m$^2$/g, even if highly dispersible precipitated silicas are preferred. Mention will also be made, as reinforcing inorganic filler, of mineral fillers of the aluminous type, in particular alumina ($Al_2O_3$) or aluminium (oxide)hydroxides, or else reinforcing titanium oxides.

The physical state in which the reinforcing inorganic filler is provided is immaterial, whether in the powder, microbead, granule or bead form. Of course, the term "reinforcing inorganic filler" is also understood to mean mixtures of various reinforcing inorganic fillers, in particular of highly dispersible silicas as described above.

All carbon blacks, in particular blacks of the HAF, ISAF, SAF, FF, FEF, GPF and SRF types, conventionally used in tyre rubber compositions ("tyre-grade" blacks) are suitable as reinforcing organic filler. Mention will more particularly be made, among the latter, of the reinforcing carbon blacks of the 100, 200 or 300 series (ASTM grades), such as, for example, the N115, N134, N234, N326, N330, N339, N347 or N375 blacks, but also coarser blacks, such as, for example, the N550 or N683 blacks. The carbon blacks might, for example, be already incorporated in the natural rubber in the form of a masterbatch.

The black/silica blends or the blacks partially or fully covered with silica are suitable for forming the reinforcing filler. Carbon blacks modified by silica, such as, without implied limitation, the fillers which are sold by Cabot under the name "CRX 2000", and which are described in the international patent document WO-A-96/37547, are also suitable.

Mention may be made, as examples of reinforcing organic fillers other than carbon blacks, of functionalized polyvinylaromatic organic fillers, as described in patent applications WO-A-2006/069792 and WO-A-2006/069793, or else of functionalized nonaromatic polyvinyl organic fillers, as described in patent applications WO-A-2008/003434 and WO-A-2008/003435.

In the case where the reinforcing filler comprises only a predominant reinforcing inorganic filler and carbon black, the weight fraction of this carbon black in said reinforcing filler is more preferably chosen to be less than or equal to 30%, relative to the total weight of the reinforcing filler.

In the case where the reinforcing filler comprises a reinforcing inorganic filler, the rubber composition according to the invention comprises at least four compounds, including a coupling agent for coupling the reinforcing inorganic filler to the natural rubber and to the optional diene elastomers which make up the elastomeric matrix.

The term "coupling agent" is understood to mean more specifically an agent capable of establishing a satisfactory connection of chemical and/or physical nature between the filler in question and the elastomer, while facilitating the dispersion of this filler within the elastomeric matrix. Such an at least bifunctional bonding agent has, for example, the simplified general formula "Y-T-X'", in which:

Y represents a functional group ("Y" function) which is capable of being bonded physically and/or chemically to the inorganic filler, it being possible for such a bond to be established, for example, between a silicon atom of the coupling agent and the surface hydroxyl (—OH) groups of the inorganic filler (for example the surface silanols, when silica is concerned);

X' represents a functional group ("X'" function) capable of being bonded physically and/or chemically to the elastomer, for example via a sulphur atom;

T represents a divalent group which makes it possible to connect Y and X'.

Agents referred to as covering agents for covering inorganic filler particles may also be used. They are capable of further improving, by bonding to the surface functional sites of the inorganic filler and by thus covering it at least partially, the dispersion of this inorganic filler in the elastomeric matrix, thus lowering its viscosity in the uncured state and on the whole improving its processability in the uncured state.

Such covering agents essentially belong to the family of polyols (for example diols, triols such as glycerol or its derivatives), polyethers (for example polyethylene glycols), primary, secondary or tertiary amines (for example trialkanolamines), hydroxylated or hydrolysable polyorganosiloxanes, for example α,ω-dihydroxypolyorganosilanes (in particular α,ω-dihydroxypolydimethylsiloxanes), hydroxysilanes, alkylalkoxysilanes, in particular alkyltriethoxysilanes, such as for example 1-octyltriethoxysilane sold by Degussa-Evonik under the name Dynasylan Octeo. These covering agents are well known in tyre rubber compositions reinforced with an inorganic filler; they have been described, for example, in patent applications WO 00/05300, WO 01/55252, WO 01/96442, WO 02/031041, WO 02/053634, WO 02/083782, WO 03/002648, WO 03/002653, WO 03/016387, WO 2006/002993, WO 2006/125533, WO 2007/017060 and WO 2007/003408.

The bonding agents must not be confused with simple agents for covering the filler in question which, in a known way, can comprise the Y function that is active with regard to the filler but are devoid of the X' function that is active with regard to the elastomer. Use may be made of any bonding agent known for or capable of efficiently providing, in the rubber compositions which can be used for the manufacture of tyres, the bonding (or the coupling) between a reinforcing inorganic filler, such as silica, and a diene elastomer, such as, for example, organosilanes, in particular alkoxysilane polysulphides or mercaptosilanes, or polyorganosiloxanes bearing the abovementioned X' and Y functions. Silica/elastomer bonding agents, in particular, have been described in a large number of documents, the most well known being bifunctional alkoxysilanes, such as alkoxysilane polysulphides. Use is made in particular of silane polysulphides, known as "symmetrical" or "unsymmetrical" according to their specific structure, as described, for example, in patent applications WO 03/002648 (or US 2005/016651) and WO 03/002649 (or US 2005/016650).

Mention will more particularly be made, as examples of silane polysulphides, of bis(3-trimethoxysilylpropyl) or bis (3-triethoxysilylpropyl)polysulphides. Use is made in particular, among these compounds, of bis(3-triethoxysilylpropyl)tetrasulphide, abbreviated to TESPT, or of bis(3-triethoxysilylpropyl)disulphide, abbreviated to TESPD. Mention will also be made, as preferred examples, of bis (mono($C_1$-$C_4$)alkoxydi-($C_1$-$C_4$)alkylsilylpropyl)polysulphides (in particular disulphides, trisulphides or tetrasulphides), more particularly bis (monoethoxydimethylsilylpropyl)tetrasulphide, as described in patent application WO 02/083782 (or US 2004/132880).

Mention will in particular be made, as coupling agent other than alkoxysilane polysulphide, of bifunctional POSs (polyorganosiloxanes), or else of hydroxysilane polysulphides, as described in patent applications WO 02/30939 (or U.S. Pat. No. 6,774,255) and WO 02/31041 (or US 2004/051210), or else of silanes or POSs bearing azodicarbonyl functional groups, as described, for example, in patent applications WO 2006/125532, WO 2006/125533 and WO 2006/125534.

Mention will for example be made, as examples of other silane sulphides, of other silanes bearing at least one thiol (SH) function (referred to as mercaptosilanes) and/or at least one blocked thiol function, as described, for example, in patents or patent applications U.S. Pat. No. 6,849,754, WO 99/09036, WO 2006/023815 and WO 2007/098080.

Of course, mixtures of the coupling agents described above could also be used, as described, in particular, in patent application WO 2006/125534.

In the compositions in accordance with the invention, the content of coupling agent is advantageously less than 20 phr. The content thereof is preferably between 0.5 and 12 phr, more preferably from 3 to 10 phr, in particular from 4 to 7 phr. This content is easily adjusted by a person skilled in the art according to the content of inorganic filler used in the composition.

A person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, for instance, without implied limitation, the fillers which are sold by Cabot under the name "CRX 2000", and which are described in the international patent document WO-A-96/37547, or else comprises, at its surface, functional sites, in particular hydroxyl sites, requiring the use of a coupling agent in order to establish the connection between the filler and the elastomer.

The rubber compositions in accordance with the invention can also comprise, in addition to coupling agents, coupling activators, agents for covering the inorganic fillers as described above, or more generally processing aids capable, in a known way, by virtue of an improvement in the dispersion of the filler in the rubber matrix and of a lowering in the viscosity of the compositions, of improving their ability to be processed in the uncured state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention can also comprise all or some of the usual additives generally used in elastomer compositions intended for the manufacture of tyres, such as, for example, pigments, protection agents, such as antiozone waxes, chemical antiozonants, antioxidants, antifatigue agents, reinforcing or plasticizing resins, methylene acceptors (for example, phenol-novolac resin) and methylene donors (for example, HMT or H3M), as described, for example, in patent application WO 02/10269, a crosslinking system based either on sulphur or on sulphur donors and/or on peroxide and/or on bismaleimides, vulcanization accelerators, vulcanization activators, adhesion promoters, such as cobalt-based compounds, plasticizing agents, preferably nonaromatic or very slightly aromatic plasticizing agents chosen from the group consisting of naphthenic oils, paraffinic oils, MES oils or TDAE oils, ether plasticizers, ester plasticizers (for example, glycerol trioleates), and hydrocarbon-based resins having a high $T_g$, preferably of greater than 30° C., as described, for example, in patent applications WO 2005/087859, WO 2006/061064 and WO 2007/017060, and the mixtures of such compounds.

The invention also relates to a process for the preparation of a rubber composition as described above.

It should be pointed out that, according to the invention, the polyimine compound can be incorporated, on an open device of mill (external mixer) type or on a closed device of internal mixer type, at any point in the process for the preparation of the rubber composition described below, including during the manufacture of the natural rubber on the site for the production thereof.

The composition is manufactured in appropriate mixers using two successive preparation phases well known to a person skilled in the art: (i) a first phase of thermomechanical working or kneading (phase referred to as "non-productive") at high temperature, up to a maximum temperature of between 130° C. and 200° C., preferably between 145° C. and 185° C., followed (ii) by a second phase of mechanical working (phase referred to as "productive") down to a lower temperature, typically of less than 110° C., for example between 40° C. and 100° C., also referred to as a finishing phase, during which the crosslinking system is incorporated. The expression "crosslinking system" is understood to mean either the crosslinking agents conventionally used with inorganic fillers or the vulcanization agents conventionally used such as sulphur or the vulcanization accelerators.

By way of example, the first (non-productive) phase is carried out in a single thermomechanical stage during which, in a first step at a temperature between 60° C. and 110° C., for example around 80° C., the diene elastomer(s) is (are) introduced into an appropriate mixer, such as an internal mixer, followed, in a second step, for example after a kneading time of about 30 seconds, by the introduction of the reinforcing filler, the polyimine compound in the aforementioned low content, the optional additional processing aids and the other additives, with the exception of the crosslinking or vulcanization system. The total kneading time, in this non-productive phase, is preferably between 2 and 6 minutes with a maximum dropping temperature of around 165° C.

After cooling the mixture thus obtained, the vulcanization system is then incorporated at a temperature between 20° C. and 50° C., for example around 40° C., generally in an external mixer, such as an open mill; the combined mixture is then mixed (productive phase) for a few minutes, for example between 2 and 6 minutes.

The process in accordance with the invention for preparing a rubber composition according to the invention comprises at least the following stages:

carrying out, at a maximum temperature of between 130° C. and 200° C., preferably between 145° C. and 185° C., for a time preferably of between 2 and 6 minutes, a first step of thermomechanical working (sometimes described as "non-productive" phase) of the necessary base constituents of the rubber composition, including the polyimine compound(s) in the aforementioned low content, with the exception of the crosslinking system, by intimately incorporating, by kneading in one or more stages, the constituents of the composition in the elastomeric matrix based on natural rubber, then carrying out, at a temperature lower than said maximum temperature of said first step, preferably of less than 110° C., for a time preferably of between 2 and 6 minutes, a second step of mechanical working (sometimes described as "productive" phase) advantageously on an open mill, during which said crosslinking system is incorporated.

It should be noted that, according to the process in accordance with the invention, the polyimine compound that must be incorporated into the composition must be incorporated at a low content, i.e. at a content between 0 and 6 mmol per 100 g of elastomer.

The polyimine compound corresponding to formula 1 or 2 described above can thus be incorporated:
  either as additive during the manufacture of the natural rubber on the site for the production thereof,
  or as ingredient of the rubber composition according to the invention:
    during the preliminary preparation of a natural rubber/polyimine masterbatch on an open device of open mill (external mixer) type or on a closed device of internal mixer type,
    without preliminary preparation of a masterbatch, directly in the external or internal mixer with the other compounds of the rubber composition.

This is why, according to one alternative form of the process according to the invention, said alternative form comprises, prior to carrying out the abovementioned stage (i), the stages of the conventional manufacture of natural rubber which comprises the addition of the polyimine compound corresponding to formula 1 or 2.

Another alternative form of the process according to the invention comprises, prior to carrying out the abovementioned stage (i), a stage of preparation of a masterbatch based on natural rubber and on the polyimine compound corresponding to formula 1 or 2.

According to another alternative form of the process of the invention, all the base constituents of the composition of the invention, including the polyimine compound but with the exception of the vulcanization system, are incorporated during the first stage (i), the "non-productive" phase.

The final composition thus obtained can then be calendered, for example in the form of a sheet or slab, or else extruded, for example to form a rubber profiled element that can be used as a semi-finished rubber product intended for a tyre.

Another subject of the invention is a tyre which incorporates, in at least one of its constituent components, a reinforced rubber composition according to the invention.

One subject of the invention is very particularly a semi-finished rubber product, comprising a reinforced rubber composition according to the invention, intended for these tyres.

Due to the reduced hysteresis which characterizes a reinforced rubber composition according to the invention, compared to the hysteresis of the composition free of polyimine compound, it should be noted that a tyre having a tread comprising the composition according to the invention exhibits improved hysteresis properties, and in particular makes it possible to significantly decrease the initial hysteresis of the composition which is synonymous with an advantageously reduced rolling resistance.

Due to the reduced hysteresis which characterizes a rubber composition according to the invention, compared to the composition free of polyimine compound, it should also be noted that a tyre, the sidewalls or all or some of the inner compositions of which comprise the composition of the invention, exhibits a significantly reduced self-heating and thus an improved endurance. The term "inner compositions" is understood to mean the compositions intended for manufacturing crown reinforcement plies, carcass reinforcement plies, beads, protectors, under layers, rubber blocks and other inner liners, especially decoupling rubbers, intended to provide the bonding or interface between the aforementioned regions of the tyres.

The tyres in accordance with the invention are in particular intended for passenger vehicles, for industrial vehicles chosen from vans, heavy vehicles, i.e. underground trains, buses, heavy road transport vehicles (lorries, tractors, trailers) or off-road vehicles, heavy agricultural vehicles or earth-moving equipment, planes, and other transportation or handling vehicles.

The abovementioned features of the present invention, and others, will be better understood on reading the following description of several exemplary embodiments of the invention, given by way of illustration and without implied limitation.

I. Measurements and Tests Used

The rubber compositions are characterized before and after curing, as indicated below:

(a) The Mooney viscosity (ML 1+4) at 100° C.: measured according to the ASTM: D-1646 standard, entitled "Mooney" in the tables.

(b) The dynamic properties $\Delta G^*$ and $\tan(\delta)$max are measured on a viscosity analyser (Metravib VA4000) according to the ASTM D 5992-96 standard. The response of a sample of vulcanized composition (cylindrical test specimen with a thickness of 2 mm and with a cross section of 79 mm$^2$), subjected to a simple alternating sinusoidal shear stress, at a frequency of 10 Hz, under standard temperature conditions (23° C.) according to the ASTM D 1349-99 standard, is recorded. A peak-to-peak strain amplitude sweep is carried out from 0.1 to 50% (outward cycle) and then from 50 to 0.1% (return cycle). The results made use of are the complex dynamic shear modulus (G*) and the loss factor tan δ. The maximum value of tan δ observed (tan(δ)max), and the difference in complex modulus ($\Delta G^*$) between the values at 0.1% and 50% strain (Payne effect), are shown for the return cycle.

II. Masterbatch Preparation

Four polyimine molecules, shown in the figures below, were used as an additive for natural rubber in order to manufacture a masterbatch in accordance with a variant of the process of the invention:

N,N'-Bis(2,6-dimethylheptan-4-ylidene)hexane-1,6-diamine (HMDI DIBK),

N,N'-dicyclopentylidenehexane-1,6-diamine (HMDI cyclopentanone),

N,N'-dicyclohexylidenecyclohexane-1,4-diamine, (1,4DACH cyclohexanone),

N-(2,6-dimethylheptan-4-ylidene)-N',N'-bis(2-(2,6-dimethylheptan-4-ylideneamino)-ethyl)ethane-1,2-diamine (TAEA DIBK).

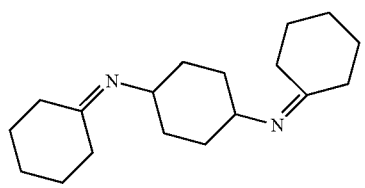

1,4DACH cyclohexanone

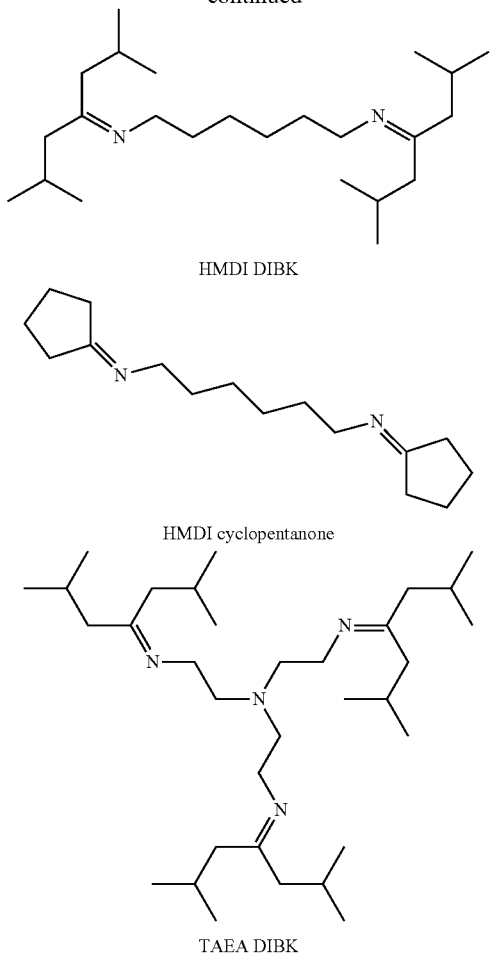

HMDI DIBK

HMDI cyclopentanone

TAEA DIBK

Polyimine Synthesis:

1,4DACH Cyclohexanone

Introduced into a 500 ml three-necked, round-bottomed flask equipped with a mechanical stirring system, a Dean-Stark trap and a dropping funnel are 50 g of 1,4-diaminocyclo-hexane (0.43 mol), 170 g of cyclohexanone (1.7 mol) and 150 ml of methylcyclohexane. The reaction medium is sparged with nitrogen for 5 minutes at room temperature, then heated at reflux using a thermostated oil bath, the temperature of which is 160° C. After refluxing for 7 hours, the reaction medium is cooled, then the excess reactants are removed by evaporation at 80° C. under a pressure of 20 mbar. 64 g of a white solid are obtained.

HMDI DIBK

Introduced into a round-bottomed flask equipped with a Dean-Stark reflux condenser and a stirring system are 29 g (0.25 mol) of hexamethylenediamine and 360 g (2.5 mol) of 2,6-dimethylheptan-4-one. The reaction medium is brought to reflux until 0.5 mol of water (9 mL) is recovered via distillation. Next, the reaction medium is cooled down to room temperature and the excess ketone is distilled at 80° C. under 40 mbar.

HMDI Cyclopentanone

Introduced into a round-bottomed flask equipped with a Dean-Stark reflux condenser and a stirring system are 29 g (0.25 mol) of hexamethylenediamine and 210 g (2.5 mol) of cyclopentanone. The reaction medium is brought to reflux until 0.5 mol of water (9 mL) is recovered via distillation. Next, the reaction medium is cooled down to room temperature and the excess ketone is distilled at 80° C. under 40 mbar.

TAEA DIBK

Introduced into a round-bottomed flask equipped with a Dean-Stark reflux condenser and a stirring system are 37 g (0.25 mol) of N,N-bis(2-aminoethyl)ethane-1,2-diamine and 360 g (2.5 mol) of 2,6-dimethylheptan-4-one. The reaction medium is brought to reflux until 0.75 mol of water (12 mL) is recovered via distillation. Next, the reaction medium is cooled down to room temperature and the excess ketone is distilled at 80° C. under 40 mbar.

Masterbatch Preparation

The natural rubber used to form the masterbatches (M..., for example, MB, MC or MD) is an NR referenced TSR20.

The method of incorporating the molecule is as follows:

The natural rubber is subjected, on an open mill, the rolls of which have a diameter equal to 150 mm, a nip equal to 2 mm and a rotational speed of the rolls of 20 rpm, to the following stages:

Step 1: 3 passes of the natural rubber initially at ambient temperature;
Step 2: addition of a given amount of polyimines in powder form;
Step 3: carrying out 12 passes so as to disperse the powder and to homogenize the sample.

The breakdown is given in Table 1 below.

The stages that the natural rubber is subjected to are indicated by a cross in the table.

Table 1

| Elastomer or masterbatch | Type | Polyimine | Amount in phr | Amount in mmol per 100 g of elastomer | Stage 1 | Stage 2 | Stage 3 |
|---|---|---|---|---|---|---|---|
| A | TSR20 | | | | X | | X |
| MB | TSR20 | 1,4DACH cyclohexanone | 0.71 | 2.6 | X | X | X |
| MC | TSR20 | HMDI DIBK | 0.94 | 2.6 | X | X | X |
| MD | TSR20 | HMDI cyclopentanone | 0.64 | 2.6 | X | X | X |
| ME | TSR20 | TAEA DIBK | 0.89 | 1.7 | X | X | X |

The amounts of the various imines added are identical in terms of number of moles of imine functions.

III. Exemplary Embodiment of the Invention

The objective of the exemplary embodiment is to compare the properties of a composition in accordance with the invention that comprises a polyimine compound at a low content and which is prepared according to the process in accordance with the invention with to another composition that is identical except that it does not comprise a polyimine compound. The procedure for producing the compositions is the same for all the compositions tested.

EXAMPLE 1

The example shows the improved properties (hysteresis) of a composition in accordance with the invention, when the reinforcing filler is 100% an organic filler such as carbon black.

The compositions tested have the following formulation (expressed in phr: parts per hundred parts of elastomer):

Table 1

| | |
|---|---|
| Diene elastomer (1) | 100 |
| Filler (2) | 54 |
| Antioxidant (3) | 4 |
| Paraffin | 1 |
| Stearic acid (4) | 1.5 |
| ZnO (5) | 3 |
| Accelerator (6) | 1.1 |
| Sulphur | 1.1 |

(1) = Natural rubber
(2) = Carbon black N234
(3) = N-(1,3-Dimethylbutyl)-N'-phenyl-p-phenylenediamine ("Santoflex 6-PPD"from Flexsys)
(4) = "Pristerene 4931" from Uniquema
(5) = industrial grade from Umicore
(6) = CBS from Flexsys Each of the following compositions is produced, in a first step, by thermomechanical working and then, in a second finishing step, by mechanical working.

The elastomer and, 30 seconds later, the carbon black, the stearic acid, the zinc oxide, the antioxidant and the paraffin are successively introduced into a laboratory internal mixer of "Banbury" type, the capacity of which is 85 cm$^3$, which is 70% filled and which has a starting temperature of approximately 80° C.

The stage of thermomechanical working is carried out for 3 to 5 minutes, up to a maximum dropping temperature of approximately 165° C.

The first abovementioned step of thermomechanical working is thus carried out, it being specified that the mean speed of the blades during this first step is 70 rpm.

The mixture thus obtained is recovered and cooled and then, in an external mixer (homofinisher), the sulphur and the sulphenamide are added at 40° C., the combined mixture being further mixed for a time of 3 to 4 minutes (second abovementioned step of mechanical working).

The compositions thus obtained are subsequently calendered, either in the form of slabs (with a thickness ranging from 2 to 3 mm) or fine sheets of rubber, for the measurement of their physical or mechanical properties.

Results Obtained:

Table 2

| | Composition | | | | |
|---|---|---|---|---|---|
| | A | B | C | D | E |
| Elastomer or masterbatch | A | MB | MC | MD | ME |
| Properties in the uncrosslinked state | | | | | |
| ML 1 + 4 at 100° C. ("Mooney mixture") | 100 | 107 | 116 | 120 | 103 |

-continued

| | Composition | | | | |
|---|---|---|---|---|---|
| | A | B | C | D | E |
| Dynamic properties as a function of the strain | | | | | |
| Delta G* at 23° C. | 100 | 85 | 88 | 77 | 95 |
| tan (δ) max at 23° C. | 100 | 94 | 94 | 88 | 96 |

It should be noted that the compositions B, C, D and E according to the invention exhibit a "Mooney mixture" value which is greater than that of the composition A based on an NR merely worked on the device.

As regards the dynamic properties, it should be noted that the values of Delta G* and tan (δ) max of the compositions B, C, D and E are lower than those of the composition A based on an NR merely passed through the device. The masterbatches MB, MC, MD or ME comprising a polyimine according to the invention make it possible to improve the initial hysteresis properties, with respect to the natural rubber A passed through the device without introduction of polyimine compound.

In other words, the compositions B, C, D and E according to the invention based on NR comprising a polyimine exhibit rubber properties in the crosslinked state which are improved, with respect to those of the composition A based on unmodified NR, as a result of a substantially reduced hysteresis.

The invention claimed is:

1. A reinforced rubber composition based at least (a) on an elastomeric matrix comprising non-halogenated natural rubber (NR), (b) on a reinforcing filler, (c) on a polyimine compound corresponding to formula 1 or 2 below:

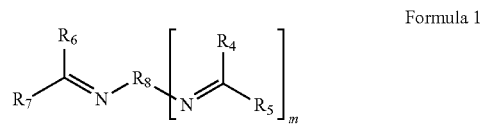

Formula 1

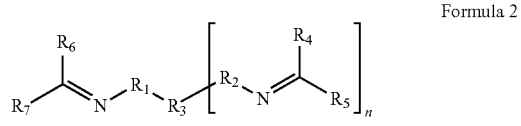

Formula 2 in which:

$R_4$, $R_5$, $R_6$ and $R_7$, which are identical or different, are selected from alkyl groups having from 1 to 20 carbon atoms, cycloalkyl groups having from 5 to 24 carbon atoms, aryl groups having from 6 to 18 carbon atoms or aralkyl groups having from 7 to 25 carbon atoms;

$R_1$ and $R_2$, which are identical or different, are selected from the group consisting of alkylidenes having from 1 to 20 carbon atoms, cycloalkylidenes having from 5 to 24 carbon atoms, arylidenes having from 6 to 18 carbon atoms, aralkylidenes having from 7 to 25 carbon atoms and heterocycles, which are identical or different, having from 4 to 25 carbon atoms;

$R_3$ and $R_8$, which are identical or different, are selected from the group consisting of alkylidenes having from 1 to 20 carbon atoms, alkylidynes having from 1 to 20 carbon atoms, alkylylidynes having from 1 to 20 carbon atoms, cycloalkylidenes havingfrom 5 to 24 carbon atoms, cycloalkylidynes having from 5 to 24 carbon atoms, cycloalkylylidynes having from 5 to 24 carbon atoms, arylidenes having from 6 to 18 carbon atoms, arylidynes having from 6 to 18 carbon atoms, arylylidynes having from 6 to 18 carbon atoms, aralkylidenes having from 7 to 25 carbon atoms, aralkylidynes having from 6 to 18 carbon atoms, aralkylylidynes having from 6 to 18 carbon atoms, and heterocycles, which are identical or different, having from 4 to 25 carbon atoms;

$R_3$ optionally comprises one or more heteroatom(s), chosen from O, N, S and Si;

m is equal to 1, 2 or 3;

n is equal to 1, 2 or 3;

wherein the polyimine compound is chosen from the group consisting of N,N'-bis(4-methylpentan-2-ylidene)hexane-1,6-diamine, N,N'-bis(2,6-dimethylheptan-4-ylidene)hexane-1,6-diamine, N,N'-bis(2,4-dimethylpentan-3-ylidene)hexane-1,6-diamine, N,N-'-bis(4-methylpentan-2-ylidene)octane-1,8-diamine, N,N'-bis(2,6-dimethylheptan-4-ylidene)octane-1,8-diamine, N,N'-bis(2,4-dimethylpentan-3-ylidene)octane-1,8-diamine, N,N'-dicyclopentylidenehexane-1,6-diamine, N,N'-dicyclopentylideneoctane-1,8-diamine, N,N'-dicyclohexylidenehexane-1,6-diamine, N,N'-dicyclohexylideneoctane-1,8-diamine, N,N'-bis(4-methylpentan-2-ylidene)cyclohexane-1,4-diamine, N,N'-bis(4-methylpentan-2-ylidene)-cyclohexane-1,2-diamine, N,N'-bis(2,6-dimethylheptan-4-ylidene)cyclohexane-1,4-diamine, N,N'-bis(2,6-dimethylheptan-4-ylidene)cyclohexane-1,2-diamine, N,N'-dicyclohexylidene-cyclohexane-1,4-diamine, N,N'-dicyclohexylidenecyclohexane-1,2-diamine, N-(4-methyl-pentan-2-ylidene)-N',N'-bis((4-methylpentan-2-ylideneamino)ethyl)ethane-1,2-diamine and N-(2,6-dimethylheptan-4-ylidene)-N',N'-bis(2-(2,6-dimethylheptan-4-ylideneamino)ethyl)-ethane-1,2-diamine.

2. The rubber composition according to claim 1, wherein the polyimine compound is present in a proportion of between 0 and 6 mmol per 100 g of elastomer.

3. The rubber composition according to claim 1, wherein the weight fraction of natural rubber in the elastomeric matrix is greater than or equal to 50% by weight of the total weight of the matrix.

4. The rubber composition according to claim 3, wherein the elastomeric matrix consists of 100% by weight natural rubber.

5. The rubber composition according to claim 1, wherein the reinforcing filler comprises an organic filler in a proportion of 100% by weight of the total weight of the reinforcing filler.

6. The rubber composition according to claim 1, wherein the reinforcing filler comprises an inorganic filler and wherein the composition further comprises a coupling agent.

7. The rubber composition according to claim 1, wherein the reinforcing filler comprises a reinforcing inorganic filler in proportions ranging from 55% to 100% by weight of the total weight of the reinforcing filler.

8. A process for the preparation of a reinforced rubber composition as described in claim 1, comprising:

(i) carrying out, at a maximum temperature of between 130° C. and 200° C., a first step of thermomechanical working of the necessary base constituents of the rubber composition, with the exception of the crosslinking system, by intimately incorporating, by kneading, ingredients of the composition in the elastomeric matrix based on natural rubber, then (ii) carrying out, at a temperature lower than said maximum temperature of said first step, a second step of mechanical working during which said crosslinking system is incorporated, wherein, prior to carrying out the abovementioned stage (i), the process comprises the stages of the manufacture of natural rubber comprising a stage of addition of the polyimine compound corresponding to formula 1 or 2.

9. A process for the preparation of a reinforced rubber composition as described in claim 1, comprising the following stages:

(i) carrying out, at a maximum temperature of between 130° C. and 200° C., a first step of thermomechanical working of the necessary base constituents of the rubber composition, with the exception of the crosslinking system, by intimately incorporating, by kneading, ingredients of the composition in the elastomeric matrix based on natural rubber, then (ii) carrying out, at a temperature lower than said maximum temperature of said first step, a second step of mechanical working during which said crosslinking system is incorporated, wherein, prior to carrying out the abovementioned stage (i), the process comprises a stage of preparation of a masterbatch based on natural rubber and on the polyimine compound.

10. A process for the preparation of a reinforced rubber composition as described in claim 1, comprising the following stages:

(i) carrying out, at a maximum temperature of between 130° C. and 200° C., a first step of thermomechanical working of the necessary base constituents of the rubber composition, with the exception of the crosslinking system, by intimately incorporating, by kneading, ingredients of the composition in the elastomeric matrix based on natural rubber, then (ii) carrying out, at a temperature lower than said maximum temperature of said first step, a second step of mechanical working during which said crosslinking system is incorporated, wherein the polyimine compound is added directly during stage (i) with the other compounds of the composition.

11. The process according to claim 8, wherein the polyimine compound is added in a small proportion of between 0 and 6 mmol per 100 g of elastomer.

12. A tire semi-finished rubber product, comprising a crosslinkable or crosslinked rubber composition according to claim 1.

13. A tire, comprising a semi-finished product according to claim 12.

14. The rubber composition according to claim 2, wherein the polyimine compound is present in a proportion ranging from 1 to 5 mmol per 100g of elastomer.

15. The rubber composition according to claim 5, wherein the organic filler is carbon black.

16. The rubber composition according to claim 6, wherein the inorganic filler is a reinforcing silica.

17. The process according to claim 8, wherein the second step of mechanical working during which said crosslinking system is incorporated is carried out at a temperature less than 110° C.

18. The process according to claim 9, wherein the second step of mechanical working during which said crosslinking system is incorporated is carried out at a temperature less than 110° C.

19. The process according to claim 10, wherein the second step of mechanical working during which said crosslinking system is incorporated is carried out at a temperature less than 110° C.

* * * * *